United States Patent [19]

Mattern

[11] 4,166,198

[45] Aug. 28, 1979

[54] PROCESS FOR OPERATING SUB-ZONES OF A DIGITAL T.D.M. TELECOMMUNICATIONS NETWORK FOR LONG DISTANCE TRAFFIC

[75] Inventor: Alfred Mattern, Groebenzell, Fed. Rep. of Germany

[73] Assignee: Siemens Aktiengesellschaft, Berlin & Munich, Fed. Rep. of Germany

[21] Appl. No.: 876,015

[22] Filed: Feb. 8, 1978

[30] Foreign Application Priority Data

Feb. 24, 1977 [DE] Fed. Rep. of Germany ....... 2708037

[51] Int. Cl.$^2$ .......................... H04Q 9/00; H04J 3/00; H04Q 11/04
[52] U.S. Cl. ................................. 179/15 BA; 178/50; 179/15 AL
[58] Field of Search ........ 179/15 AQ, 15 AT, 15 BA, 179/15 BV, 15 AL, 15 BY, 18 EA; 178/3, 50

[56] References Cited

U.S. PATENT DOCUMENTS

| 4,011,412 | 3/1977 | Mattern | 179/15 BA |
| 4,051,328 | 9/1977 | Mattern | 179/15 AL |
| 4,074,232 | 2/1978 | Otomo et al. | 179/15 BA |

*Primary Examiner*—Thomas A. Robinson
*Attorney, Agent, or Firm*—Hill, Van Santen, Steadman, Chiara & Simpson

[57] ABSTRACT

A process for operating a digital T.D.M. telecommunications network for long distance traffic in which, on the wide band transmission lengths which connect the exchanges there are transmitted information blocks which each comprise items of information emanating from subscriber groups and which can be identified either by a preceding block address or by the sequence of their occurrence. At least in the case of individual main transmission links which connect two main exchanges there are formed one or more branch stations at which information blocks intended for a further exchange are emitted or information blocks emitting from the exchange are received, and the information blocks are switched at a specific number of the two main exchanges connected by the main transmission link and therefore always pass through.

4 Claims, 2 Drawing Figures

PROCESS FOR OPERATING SUB-ZONES OF A DIGITAL T.D.M. TELECOMMUNICATIONS NETWORK FOR LONG DISTANCE TRAFFIC

BACKGROUND OF THE INVENTION

1. Field of the Invention

This invention relates to a process for operating sub-zones of a digital T.D.M. telecommunications network for long distance traffic wherein, on the wide-band transmission lengths which connect the exchanges there are transmitted information blocks, each of which blocks comprise items of information emanating from subscriber groups and which can be identified either by a preceding block address or by the sequence of block occurrence.

2. Description of the Prior Art

In the area of pulse code modulation (PCM) time divisional multiplex (T.D.M.) end exchanges it is known in the art, for example from U.S. Ser. No. 497,293, now U.S. Pat. No. 4,011,412 to transmit, on a common transmission line, from the end exchange, items of information which are each preceded by a subscriber address and which are taken up by the addressed subscriber station as a result of the receipt of this subscriber address. The subscriber stations subsequently emit the items of information which they are to transmit, in that they modulate this information onto an unmodulated bit group arriving from the end exchange following their own address and forward this bit group in the direction of transmission. The described processes take place in channel time slots allocated by the end exchange. The expense of individual subscriber devices in order to achieve a correctly timed operation of the subscriber end stations can, in this manner, be kept very low. If, in spite of the use of a wide-band transmission medium, for example in the form of a glass fiber line, the transmission of subscriber addresses occupies too large a part of the available transmission band, which can be the case when types of information other than telephone information are additionally transmitted on the transmission line, for example broadcast information, television information in association with video telephony and data, it is possible to use another known manner of operating telecommunications networks in the region of an end exchange wherein the transmission of subscriber addresses is obviated, for example, as disclosed in the German published application No. 2,438,199, corresponding to U.S. Pat. No. 4,051,328.

In this known process, from an end exchange which has outgoing T.D.M. lines and incoming T.D.M. lines, the items of telecommunications information for subscriber end stations participating in connections of a T.D.M. line are transmitted in the sequence of their connection to the T.D.M. line. At the beginning of each sampling pulse frame, the participating subscriber end stations are rendered ready for reception, but are continuously blocked from receiving items of telecommunications information transmitted by other subscriber end stations. Following the first reception and transmission of the items of telecommunications information which they are to transmit in the ongoing direction, the individual subscriber end stations are blocked from receiving further items of telecommunications information emanating from the exchange, in which they allow these items of information to pass through. Therefore, the allocation of the items of information to individual subscriber end stations is carried out on the basis of the sequence in which the items of information occur on the transmission line.

SUMMARY OF THE INVENTION

The object of the present invention is to provide a process which, employing one of the two aforementioned switching principles, also permits a T.D.M. telecommunications network to be operated in long distance traffic with the best possible exploitation of the transmission links.

This object is realized, according to the present invention, in that at least in the case of individual main transmission links which connect two main exchanges, there are formed one or more branch stations at which information blocks intended for a further exchange are transmitted or information blocks emanating from such a further exchange are received, where these information blocks are switched through at a specific member of the two main exchanges connected by the main transmission link, and therefore always pass through.

As a result of the process of the present invention it is possible to exploit unused transmission capacity of a main transmission link connecting two main exchanges by employing the main transmission link to handle the mutual traffic between exchanges accessible via the aforementioned branch stations and traffic between exchanges of this type and the main exchanges at the end of the main transmission link.

The further exchanges can be those exchanges which have a lower incidence of traffic, but on the other hand it is also possible that these exchanges are additionally connected to one another by a trunk line link or a main transmission link, the capacity of which is not sufficient, however, for the traffic to be handled so that a part thereof is conducted in the aforementioned manner via the branch points of another main transmission link. This also allows a specific degree of redundancy to be achieved which is particularly important when heavily loaded transmission links are used. The assumption of switching of the branch traffic by one of the main exchanges at the end of a main transmission link leads to a clearly defined control concept. The main exchanges can also be connected to one another by a trunk line link of the basic network.

In a further development of the process of the present invention, it is provided that the individual information blocks and groups of information blocks can be particularly characterized and how the main exchange, which assumes the branch traffic, must be equipped in order to carry out such a branch traffic flow in a expedient and advantageous manner.

BRIEF DESCRIPTION OF THE DRAWINGS

Other objects, features and advantages, of the invention, its organization, construction and operation will be best understood from the following detailed description, taken in conjunction with the accompanying drawings, on which.

DESCRIPTION OF THE PREFERRED EMBODIMENTS

Figure 1:
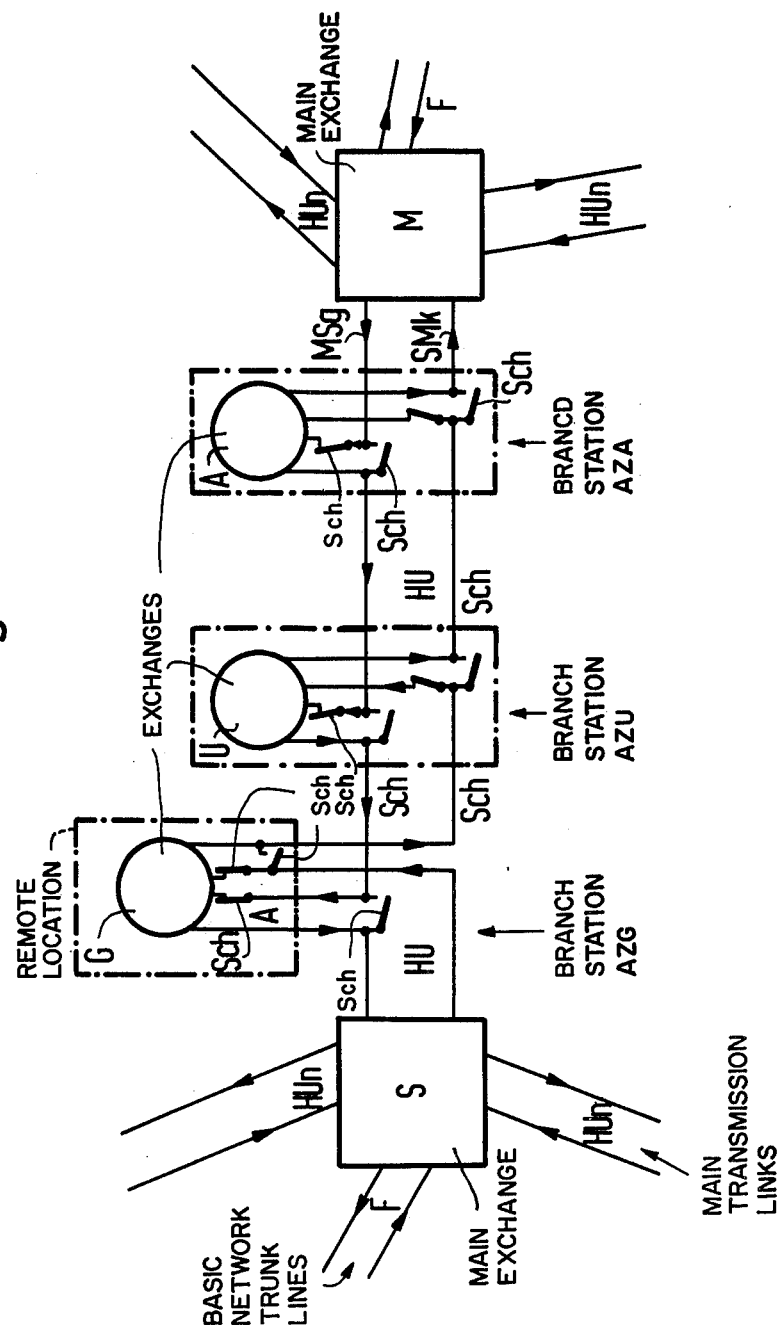
FIG. 1 is a schematic diagram of a main transmission link which connects two main exchanges, with three further exchanges which can be reached via branch stations.

Referring to FIG. 1, a part of a long distance traffic network is illustrated in which, at the ends of a main transmission link HU the main exchanges M and S are connected which are transit exchanges, preferably having a high incidence of traffic. The exchanges M and S are connected via further main transmission links HUn or basic network trunk lines F to other exchanges.

Therefore, here the main transmission link HU serves both to transmit the transit traffic between the main exchanges M and S, and to handle the traffic which arises and terminates in the region of these main exchanges.

In accordance with the present invention, on the main transmission link HU there are formed branch stations AZG, AZU and AZA at which information blocks intended for a further exchange, namely for the exchanges G, U and A, are transmitted, or information blocks transmitted from said exchanges are received. These are preferably exchanges having a low incidence of traffic.

The branching of the traffic handled by way of the main transmission link HU to the exchanges G, U and A, and the looping in of the traffic emanating from these exchanges is symbolized in FIG. 1 by the switch Sch, with the aid of which the branch lines formed at the branch stations to the exchanges G, U and A in the form of a loop of the lines of the two transmission directions of the main transmission link can be shunted. As indicated, for example at the exchange G, the branch lines can constitute a connection to a remote location. However, it is also possible, as illustrated in the examples of the exchanges U and A, for the transmission link HU to, in practice, pass through the exchanges accessible at the branch stations.

Therefore, in addition to the aforementioned traffic handled between the main exchanges M and S, which primarily consists of transit traffic, the main transmission link HU also conducts the traffic of the exchanges G, U and A among one another, and the traffic between these exchanges and the main exchanges M and S.

According to the invention, the switching of the information blocks associated with this mutual traffic is carried out at a specific member of the two main exchanges connected by the main transmission link. The following explanations will assume that this main exchange is the main exchange M. However, it is also possible for the other main exchange S located at the end of the main transmission link HU to additionally assume the switching of the mutual traffic between exchanges accessible via branch stations of a second main transmission link HU-S-M and the main exchanges.

In the event that the mutual traffic is handled by the main exchange M, the main exchange M transmits the information blocks for the further exchanges which can be reached via the branch stations in the sequence of the spatial positioning of the branch stations, thus in the sequence A, U and G followed by the information block which is intended for the other exchange S at the end of the main transmission link HU and which is associated with the mutual traffic between these exchanges, and finally the information block which relates to the transit traffic to be connected via the exchange S. The first information block of each sampling pulse frame is preceded by an opening code word of a first type, which opens the accesses to the further exchanges which it passes and, in the case of the second exchange S at the end of the main transmission link, the access to the exchange memory for the mutual traffic, and suppresses information transmission therefrom. At the end of each of the aforementioned information blocks, there follows a separating code word which cancels the opening and blockage effected by the opening code word. In the case of the second main exchange S at the end of the main transmission link, a separating code word also instigates the opening of access for the transit traffic.

In this manner it is ensured that the first exchange on the M-S link which is not to be supplied with information will, in each case, accommodate the information block which it receives. On the basis of the aforementioned sequence of the information blocks corresponding to the sequence in which the exchanges are connected to the main transmission link, this information block is also, in fact, the information block intended for the first exchange. The information blocks which follow during a pulse frame are allowed through unobstructed by exchanges supplied in this manner.

Following the commencement of its accessibility to the transit traffic with which it is fed from the exchange M, the second main exchange S at the end of the main transmission link HU initially transmits an information block in the direction M which is intended for the transit traffic to the first main exchange M at the beginning of the main transmission link; this is followed by a separating code word for transfers required in the exchange M, followed by an information block which relates to the mutual traffic between the exchange S and the exchange M. It is again concluded by a separating code word for the exchange M. There then follows a closing code word which closes the aforementioned procedure in the exchange S and at the next branch station, thus that leading to the exchange G from which it is now forwarded, and opens up the transmission process from this exchange to the main transmission link HU. The exchange G then emits the information blocks which have been stored therein for the mutual traffic and the trunk traffic to be conducted across the first exchange M, in each case followed by a separating code word and terminated overall by a further closing code word. This closing code word emitted from the exchange G terminates the transmission process from the exchange G and opens up the transmission process for the exchange U to the main transmission link HU, where the same processes are repeated, after which the same occurs with respect to the exchange A.

Therefore, following the information blocks which represent the transit traffic and the mutual traffic and which are transmitted from the exchange S, the exchange M receives, consecutively, the information blocks which relate to the mutual traffic and which are transmitted from the exchanges G, U and A. The function of the exchange M is now to classify these incoming information blocks in accordance with the relevant exchange program.

Figure 2:
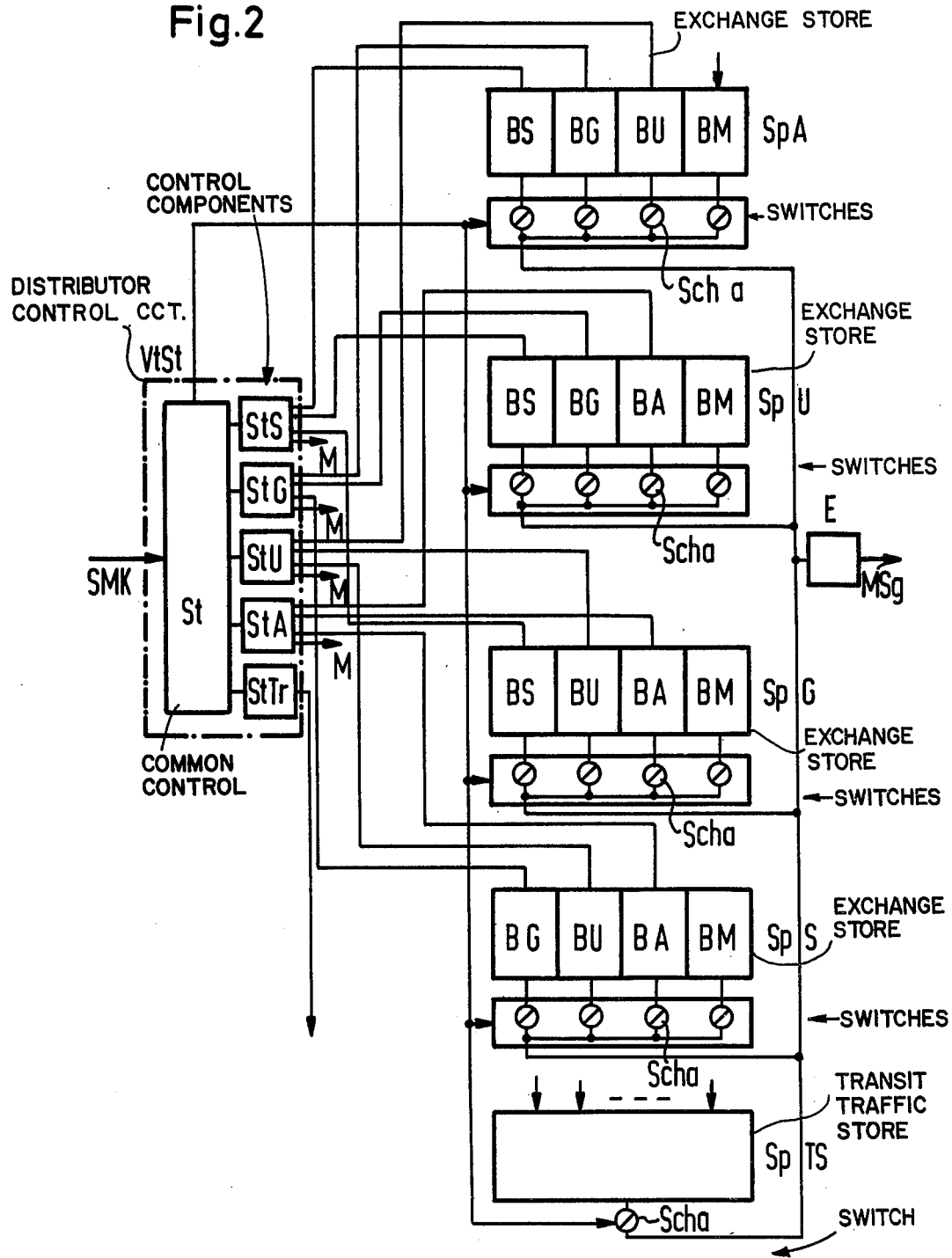
FIG. 2 is a schematic illustration of the components of the main exchange which assumes the branch traffic, at the end of the main transmission link, inasmuch as these serve to carry out the steps of the process of the present invention.

For this purpose, and as illustrated in FIG. 2, the main exchange M is provided with exchange memories SpA, SpU, SpG and SpS which are individually assigned to the other exchanges A, U, G and S which are directly accessible from the main transmission link HU, and which carry out the traffic between these exchanges, one with another, and the traffic between the main exchange M and these exchanges. The main exchange S is also assigned a memory SpTS which handles the transit traffic from the main exchange M across the main exchange S. In order to facilitate simultaneous write-in and read-out, the memories are either duplicated, in which case they are written into and read out alternately, or have a storage capacity which is such that they are able to accommodate more information than is transmitted in one pulse frame.

All the exchange memories, apart from the exchange memory SpTS, are divided into storage zones which are individually assigned to the other exchanges of origin having direct access to the main transmission link HU, apart from the exchange which is assigned to the relevant exchange memory. Therefore, for example, the exchange memory SpA assigned to the target exchange A possesses four storage zones BS, BG, BU and BM which are assigned to the exchanges of origin S, G, U and M, respectively, which are accessible not only via the exchange A, but also directly via the main transmission link HU.

The aforementioned storage zones of the individual exchange memories for the mutual traffic are accessible via a distributor control circuit VtSt which is supplied with the information blocks which arrive on the incoming part SMk of the main transmission link HU at the main exchange M.

The control circuit VtSt comprises a common control component St, and individual control components StS, StG, StU, StA and StTr.

The common control component St serves to distribute the individual information blocks in accordance with an exchange program. These individual control conponents are assigned to the individual exchanges which can be reached from the main transmission link HU, as location of origin. They serve to distribute the information blocks with which they are supplied between the relevant storage zones of the individual exchange memories SpA to SpS in accordance with the desired target exchange.

The individual control component StTr which has also been mentioned above serves to distribute the information block which is incoming from the exchange S and which relates to the transit traffic across the exchange M in further exchange memories, which have not been illustrated herein, of the exchange M which handle the forwarding of the transit traffic in different directions emanating from the exchange M.

The outputs of the storage zones of the exchange memories SpA to SpS are connected, via individual switches Scha to the outgoing part MSg, leading to the exchange S of the main transmission link HU. The switches Scha are likewise controlled from the distributor control unit VtSt and are consecutively actuated both within the groups with which they are associated in respect of each exchange memory and from group to group.

The output of the exchange memory SpTS is also connected by way of a switch Scha to the outgoing part MSg of the main transmission link HU. This switch is activated as the last in the sequence of the other switches Scha.

In the following discussion, the mode of operation of the arrangement illustrated in FIG. 2 will be explained in detail.

As will be clear from the foregoing explanation, the first information block to arrive on the incoming part SMk of the main transmission link HU in each sampling pulse frame at the exchange M is the information block which was transmitted from the exchange S and which relates to the transit traffic. This information block is fed from the common control component St to the individual control component StTr from where, as indicated, it is fed to exchange memories (not illustrated) in the exchange M, which memories are associated with the switching of the transit traffic.

The next information block to be received is that which relates to the mutual traffic with the exchanges located on the main transmission link and which emanates from the main exchange S. This information block is fed from the control component St to the following individual control component StS in the sequence, which distributes the sections of this information block between the exchange memories SpA, SpU and SpG in accordance with the desired target direction stored in the component StS for the distribution control. These sections pass into the storage zone BS assigned to the exchange S as the location of origin, in each of the exchange memories. If necessary, the sub-zones of the transmitting memories which are filled only in serial fashion via the outer link SMk will be combined in the exchange memory SpA—thus the sections BS, BG and BU—to form a sub-storage unit so that when this storage unit has been emptied only the sub-memory for the M-component need be added at the transmitting end. In order to gain storage time, this M-component was input simultaneous with the filling of the sub-storage unit.

Parts of this information block relating to the mutual traffic between the main exchange S and the main exchange M are emitted via the output M of the control component StS to devices (not shown) of the main exchange M.

There now follows the reception of the information block which emanates from the exchange G and which is fed from the control component St to the individual control component StG from where it is distributed between the exchange memories SpA, SpU, SpS in a corresponding manner, and emitted by way of the output M of the control component StG.

Corresponding steps are repeated upon receipt of the information blocks emanating from the exchanges U and A. In the aforementioned distribution processes, the sequence of the information blocks, the separating code words transmitted in between, and an exchange program corresponding to the relevant connection configuration represent the criteria for the distribution control unit VtSt. The information blocks which emanate from the main exchange M and which are associated with the mutual traffic, are entered into the storage zones BM of the exchange memories from storage components, which again have not been illustrated.

If the exchange memories are now read out in the sequence from SpA to SpTS, and their storage components are each read out consecutively within the sequence to the component BM, the last storage component, on the section MSg of the main transmission link HU leading to the main exchange S, information blocks appear in the sequence described in association with FIG. 1. The device E here serves to insert the special code words likewise described with reference to FIG. 1. These information blocks are then received by the relevant exchanges in the manner set forth above.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a process for operating a digital time division multiplex telecommunications network for long distance traffic, in which, on wide-band transmission links which connect exchanges, information blocks are transmitted and comprise items of information from subscriber groups which can be identified by a preceding block address or by the sequence of their occurrence, the network comprising a main transmission link with two ends, a first main exchange at one of said ends, a second main exchange at the other of said ends and branch stations connected intermediate said ends and connected to branch exchanges via respective branch links, the improvement therein, comprising the steps of:

sequentially transmitting information blocks from said second main exchange and said branch stations, intended for predetermined called exchanges, on said main transmission link toward said first main exchange; receiving said information blocks at said first main exchange;

switching through, at said first main exchange, those information blocks intended for others of said called exchanges; and receiving the switched-through information blocks at the branch stations associated with the called exchanges.

2. The improved process of claim 1, further defined by the steps of:

at said first main exchange transmitting the information blocks in sequence of their position along said main transmission link to the exchanges which can be reached via said branch stations and then transmitting an information block to said second main exchange relating to the mutual traffic between all exchanges having direct access to said main transmission link with said second main exchange, and then transmitting an information block to said second main exchange relating to the transit traffic to be conducted through said second main exchange, and further defined by the steps of in respect of each sampling pulse frame transmitting an opening code word prior to each information block to open access to the called exchange including access for the mutual traffic to said second main exchange and to suppress ongoing traffic, during access, on said main transmission link, and transmitting, at the end of each information block, a separating code word which cancels the opening access and the blockage of ongoing traffic caused by the opening code word and, in the case of said second main exchange, to open the access for the following transit traffic;

at said second main exchange transmitting information blocks and following separation code words for the transit traffic to be conducted via said first main exchange and the mutual traffic to be carried out via said first main exchange, and then transmitting a closing code word to terminate transmission from said second main exchange and open transmission from the next exchange in sequential position which is accessible to said main transmission link; and at each branch exchange, in sequence of its position along said main transmission link transmitting information blocks relating to the mutual traffic and the long distance traffic to be conducted via said first main exchange, transmitting separating code words between said information blocks, and transmitting a closing word to terminate branch exchange transmission and open transmission at the next positioned exchange.

3. The improved process of claim 2, wherein said second main exchange is connected to a third main exchange via a second main transmission link with intermediately-connected branch stations and exchanges, and said second and third main exchanges perform the steps attributed to said first and second main exchanges and said intermediately-connected branch stations and exchanges perform the steps of the aforementioned branch stations and exchanges toward said second main exchange.

4. The improved process of claim 2, in which said first main exchange includes memories assigned to respective exchanges of origin and each memory contains storage components which are assigned to respective other called exchanges, and further defined by the steps of:

distributing to the memories and storing therein information blocks incoming to said first main exchange which relate to mutual traffic between the branch exchanges and the second main exchange one with another, including distributing the information blocks to and storing the same in the storage components assigned to the exchange of destination within the relevant memories assigned to the calling exchange; and transmitting the information blocks in the predetermined sequence in the opposite direction on the main transmission link.

* * * * *